Figure 1:
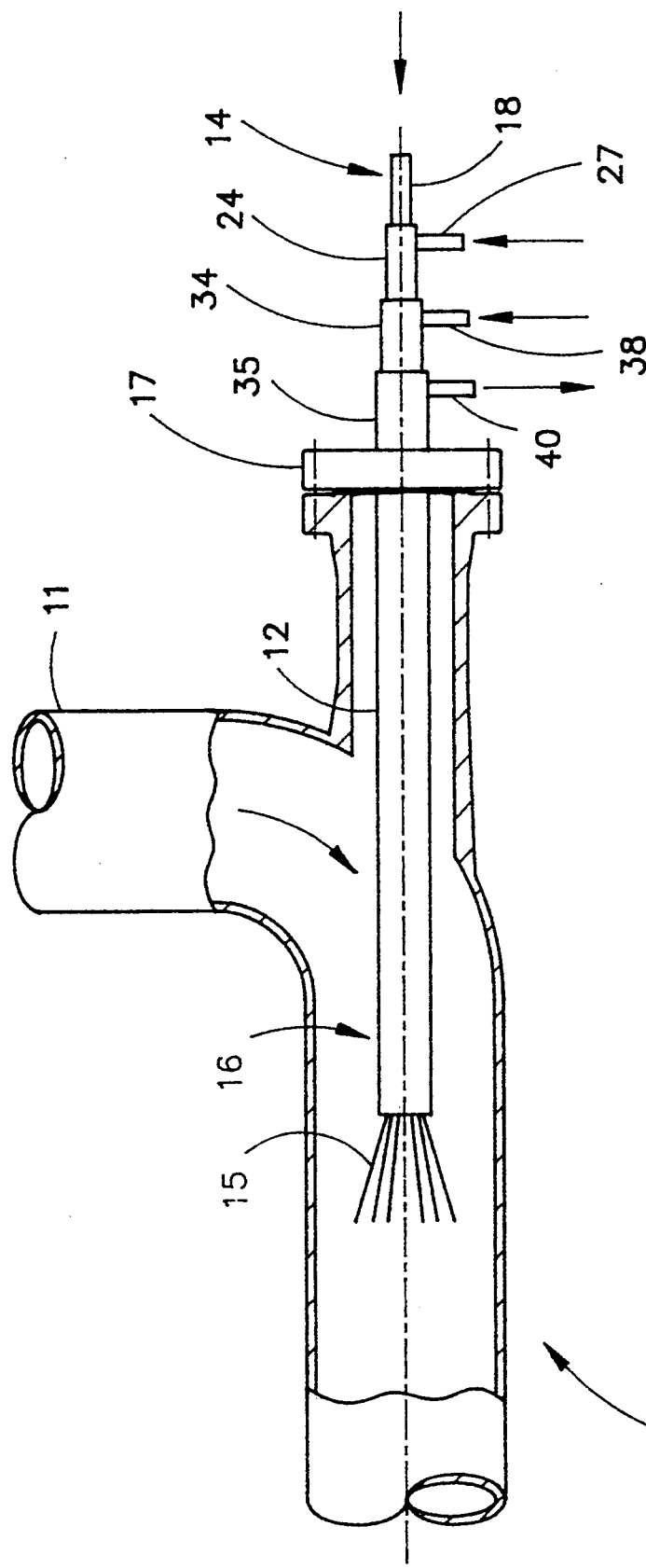

United States Patent [19]
Bogner et al.

[11] Patent Number: 5,346,133
[45] Date of Patent: Sep. 13, 1994

[54] HIGH TEMPERATURE LIQUID INJECTION APPARATUS

[75] Inventors: Alan E. Bogner, West View, Pa.; Peter Cherish, Kingwood; Scott T. Schamp, Houston, both of Tex.

[73] Assignee: The M. W. Kellogg Company, Houston, Tex.

[21] Appl. No.: 36,746

[22] Filed: Mar. 25, 1993

[51] Int. Cl.$^5$ .............................................. B05B 7/00
[52] U.S. Cl. ............................ 239/132.3; 239/419.3; 239/427.5
[58] Field of Search ................. 239/128, 132, 132.1, 239/132.3, 419.3, 427.5, 434.5; 266/216, 217, 265, 267, 270

[56] References Cited
U.S. PATENT DOCUMENTS

| | | | |
|---|---|---|---|
| 872,288 | 11/1907 | Koons | 239/132.3 |
| 1,652,372 | 12/1927 | O'Brien | 239/434.5 X |
| 2,446,511 | 8/1948 | Kerry et al. | 239/132.3 |
| 2,591,188 | 4/1952 | Nilsson | 422/185 |
| 3,034,726 | 5/1962 | Peras | 239/132 |
| 3,266,552 | 8/1966 | Denis | 239/132.3 |
| 3,408,007 | 10/1968 | Raichle et al. | 239/132 |
| 3,527,832 | 1/1970 | Pamphillis et al. | 62/85 |
| 3,547,624 | 12/1970 | Gray | 266/265 |
| 3,589,611 | 3/1971 | Jones, Jr. | 239/132 |
| 3,638,932 | 2/1972 | Masella et al. | 239/132.3 |
| 3,843,744 | 10/1974 | Kramer et al. | 208/48 R X |
| 4,647,367 | 3/1987 | Urban et al. | 208/48 AA |
| 4,887,800 | 12/1989 | Hotta et al. | 239/132.3 |
| 5,000,836 | 3/1991 | Forester | 208/48 AA |
| 5,039,391 | 8/1991 | Reid et al. | 208/48 R X |
| 5,042,964 | 8/1991 | Gitman | 266/267 |

FOREIGN PATENT DOCUMENTS 1343901 1/1947 United Kingdom ............... 266/265

*Primary Examiner*—Andres Kashnikow
*Assistant Examiner*—Lesley D. Morris
*Attorney, Agent, or Firm*—John P. Ward

[57] ABSTRACT

A feed line to a pyrolysis furnace and a liquid injection apparatus for introducing a liquid coke inhibitor in the feed line are disclosed. The injection apparatus includes a central passageway for supplying the liquid coke inhibitor, an annular passageway for delivering an atomizing gas and a mixing reservoir for mixing the liquid and gas wherein the mixed fluid is atomized by passage through an orifice in a nozzle. A cooling jacket surrounding the annular passageway prevents decomposition of the coke inhibiting agent which products can plug the nozzle. The injection apparatus is typically installed in a bend of a process feedstock conduit with a discharge end aligned to an axis of the flow. A hot injection point close to the inlet of the pyrolysis furnace is preferred for best results. To help ensure complete evaporation of a carrier liquid prior to the furnace, the injection apparatus can include an evaporation shroud. For a modularized injection system, the evaporation shroud can include a larger diameter bonnet exterior to the conduit having the injection apparatus attached thereto. For a retractable injection system, the injection apparatus is received within an isolation valve having an outlet end stuffing box.

13 Claims, 6 Drawing Sheets

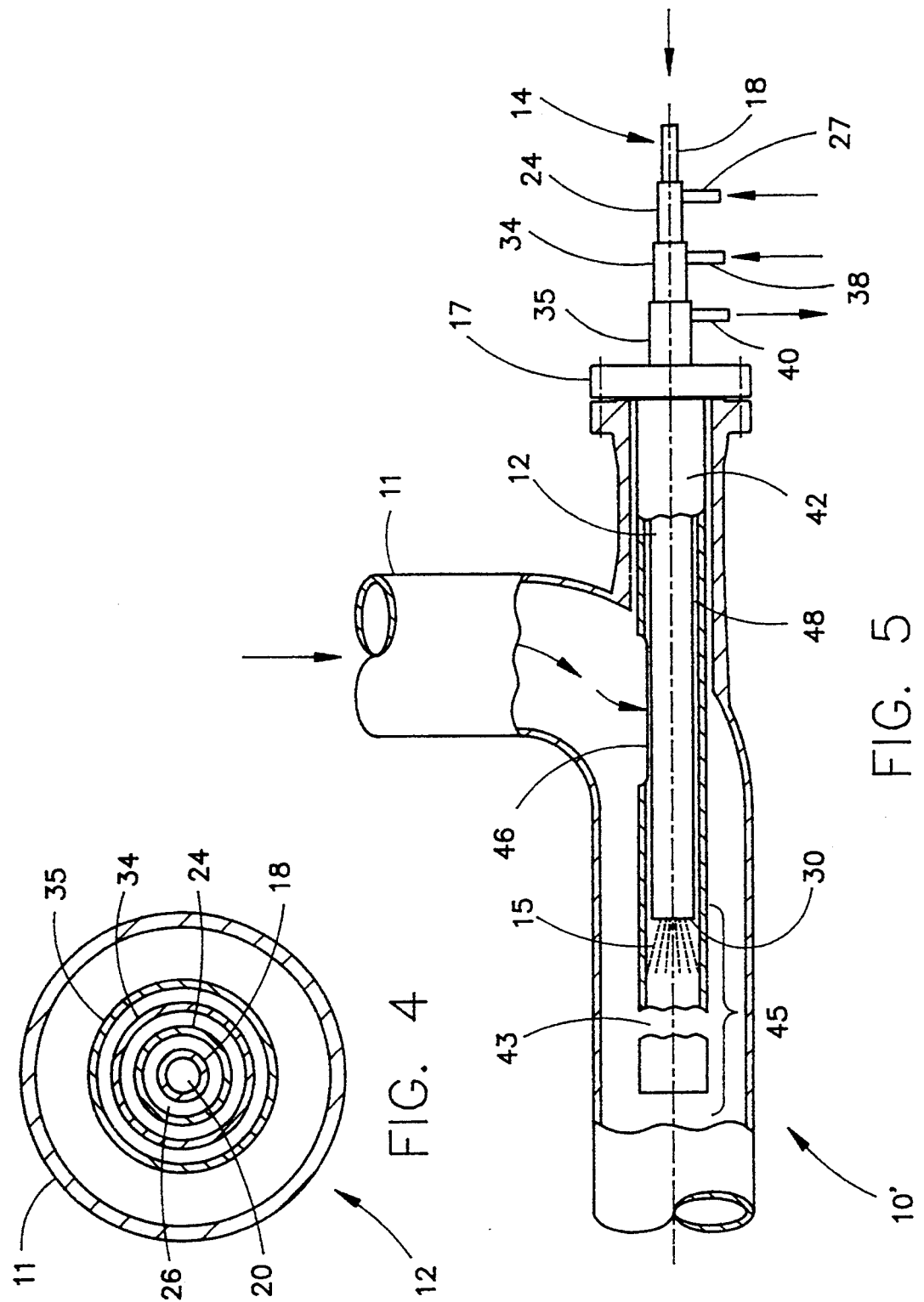

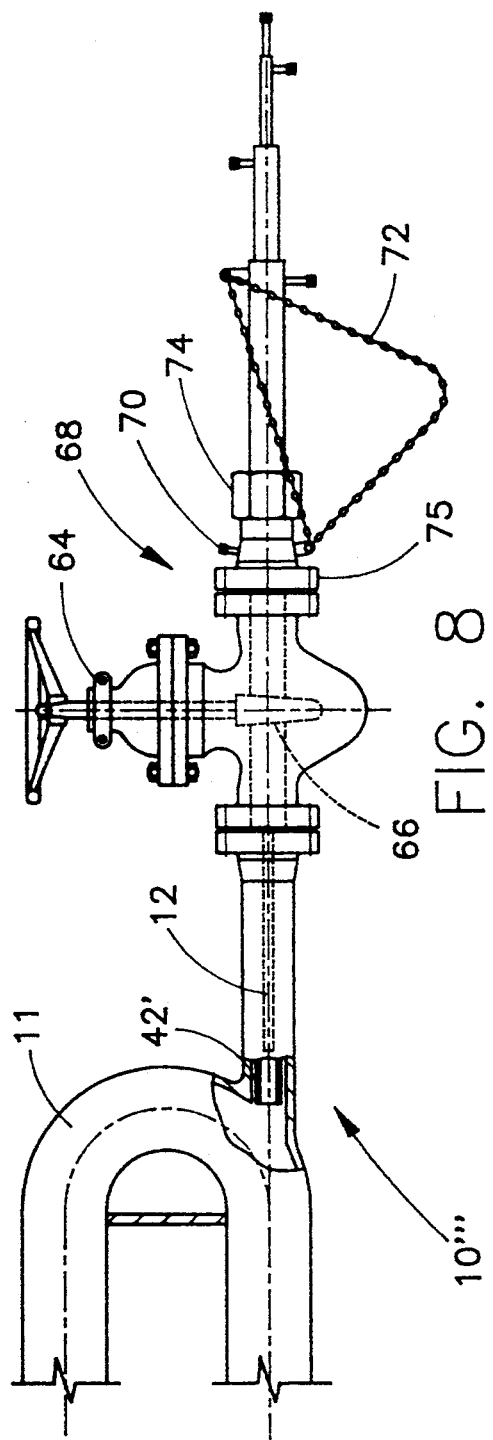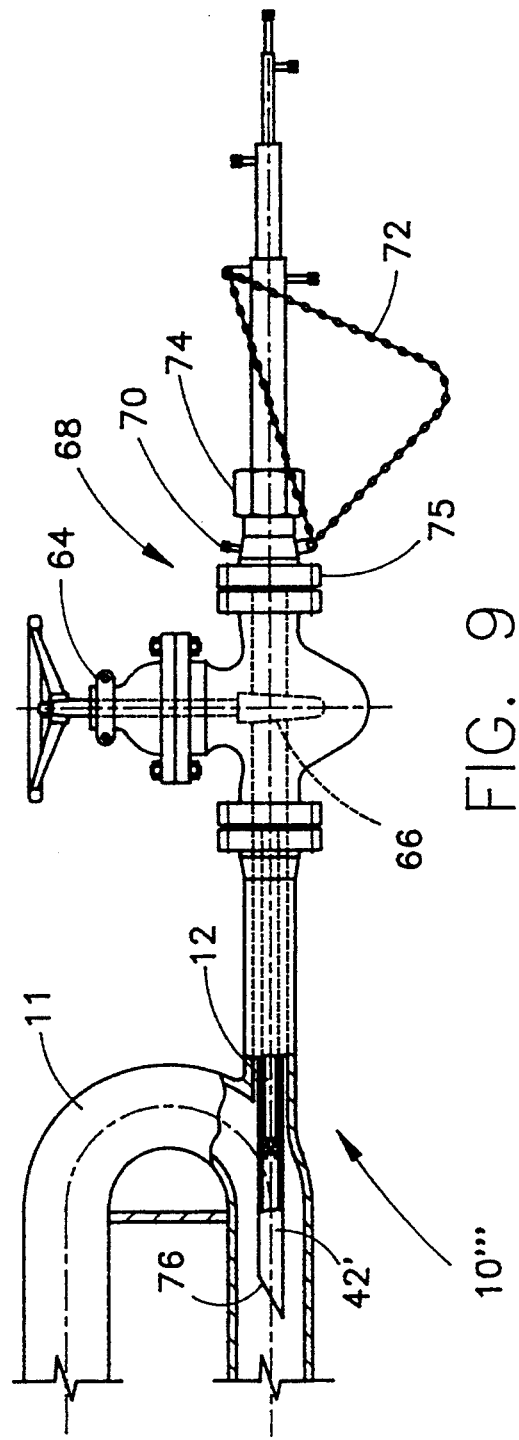

HIGH TEMPERATURE LIQUID INJECTION APPARATUS

FIELD OF THE INVENTION

The present invention relates to a liquid injection apparatus, and more particularly to an apparatus for the hot point injection of a liquid coke inhibitor in a pyrolysis process.

BACKGROUND OF THE INVENTION

A common problem associated with high temperature hydrocarbon reactions is coke formation in the furnace. Coke deposits can prevent proper heat transfer in process tubes and increase the pressure drop through the furnace. Coke build-up necessitates periodic process shutdowns for removal of the deposits. Therefore, it is very desirable to inhibit coke deposits by use of an additive which can inhibit coke formation.

The coke inhibitor can be applied as coatings to metal tube surfaces prone to deposit formation. Alternatively, the coke inhibitor can be added to the hydrocarbon feedstock. In the latter instance, the coke inhibitor is generally either dissolved or suspended in a cold inlet stream.

Recent developments have produced relatively effective coke inhibiting additives which are ordinarily solids, inorganic-based and insoluble in the feedstock. Thus, an effective apparatus is needed for dispersing these agents in the feedstock. Several problems are evident, especially for hot point addition in the feed. Solid additives must generally be introduced as a solution or suspension in a liquid carrier. Solvent evaporation due to heat from the feed can result in deposits and plugging in the injection apparatus. Liquid impingement of the liquid carrier on hot metal surfaces can promote metal fatigue in the lines. Consequently, the liquid additive must be cool at the addition point yet the solvent must be completely evaporated before hot surfaces are encountered.

U.S. Pat. No. 4,647,367 to Urban et al. discloses metallic phthalocyanine anti-fouling agents for prevention of coke deposits in high temperature petroleum reactors.

U.S. Pat. No. 3,034,726 to Peras describes a device for atomizing a liquid using a pressurized gas. The device includes an inner tube for the liquid terminating in a nozzle and an annular chamber for the gas at the nozzle. The device also includes a heating means for vaporizing the atomized liquid.

U.S. Pat. No. 3,589,611 to Jones, Jr. describes a distributor pipe for injecting fluids into a vessel wherein the distributor includes a complete cooling jacket for the portion of the tube exposed to the interior of the vessel.

U.S. Pat. No. 3,408,007 to Raichle et al. describes an apparatus for atomizing highly viscous materials such as a molten polymer with a gas. The apparatus includes a heated nozzle with a conical discharge end for the liquid. Exterior to the discharge end is a passage for the gas with a narrow frustoconical aperture.

U.S. Pat. No. 1,652,372 to O'Brien describes an atomizer comprising two overlapping tubular members forming an annular channel for liquid and an inner passage for air or gas under pressure. The atomizer terminates in a conical mixing chamber having a nozzle outlet.

U.S. Pat. No. 3,527,832 to Pamphilis et al. describes a special baffled collection manifold which is used on steam cracker furnace outlet tubes to lessen the tendency of steam cracker effluents to coke downstream from the furnace.

U.S. Pat. No. 5,039,391 to Reid et al. discloses boron containing compounds and dihydroxybenzenes to reduce coking in coker furnaces.

U.S. Pat. No. 3,843,744 to Kramer et al. describes a method for controlling and diminishing the formation of coke on the walls of reactors in the pyrolysis of hydrocarbons to acetylene which comprises injection of steam and/or inert gas at one or more critically located points downstream from the feed injection.

U.S. Pat. No. 5,000,836 to Forester discloses molybdenum and boron compounds for inhibiting coke formation in pyrolytic furnaces.

SUMMARY OF THE INVENTION

A liquid injection apparatus of the present invention includes a cooling jacket and an optional evaporation shroud to overcome problems encountered in dispersing a liquid coke inhibitor in a high temperature feedstock. Hot point injection of the coke inhibitor has been found to give enhanced results. The cooling jacket lessens the tendency for plugging in the injection nozzle to counteract carrier loss due to feed line heat. The shroud increases inhibitor residence time in the feed line to ensure rapid carrier evaporation following injection and avoids corrosive impingement on hot metal surfaces.

As one embodiment, the present invention provides a feed line to a pyrolysis furnace having utility for feeding a hot feedstock comprising a coke inhibitor intimately mixed therewith. The feed line comprises a conduit for hot feedstock flow and a longitudinal injection apparatus. The conduit has an inlet for receiving the feedstock and an outlet for discharging the feedstock to the pyrolysis furnace. The longitudinal injection apparatus has an inhibitor inlet end outside the conduit, and a discharge end centrally located in the conduit for discharging the coke inhibitor adjacent a central axis of the feedstock flow. A first central passageway in the injection apparatus supplies a fluid comprising a coke inhibitor to the discharge end. A second central passageway in the injection apparatus supplies an atomizing fluid to the discharge end. An annular cooling jacket circulates coolant around the first central passageway to inhibit fouling in the first central passageway of the injector apparatus and in the discharge orifice. A mixing chamber at the discharge end receives the coke inhibitor and atomizing fluids to form a fluid mixture. A discharge orifice atomizes the coke inhibitor fluid as the fluid mixture passes from the chamber into the feedstock flow. The inhibitor fluid is substantially vaporized before impinging upon a surface of the conduit and entering the pyrolysis furnace.

Figure 3:
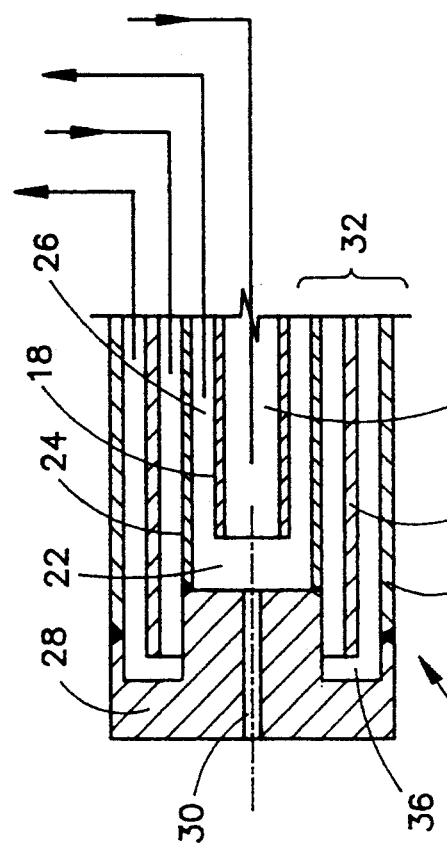
Figure 2:
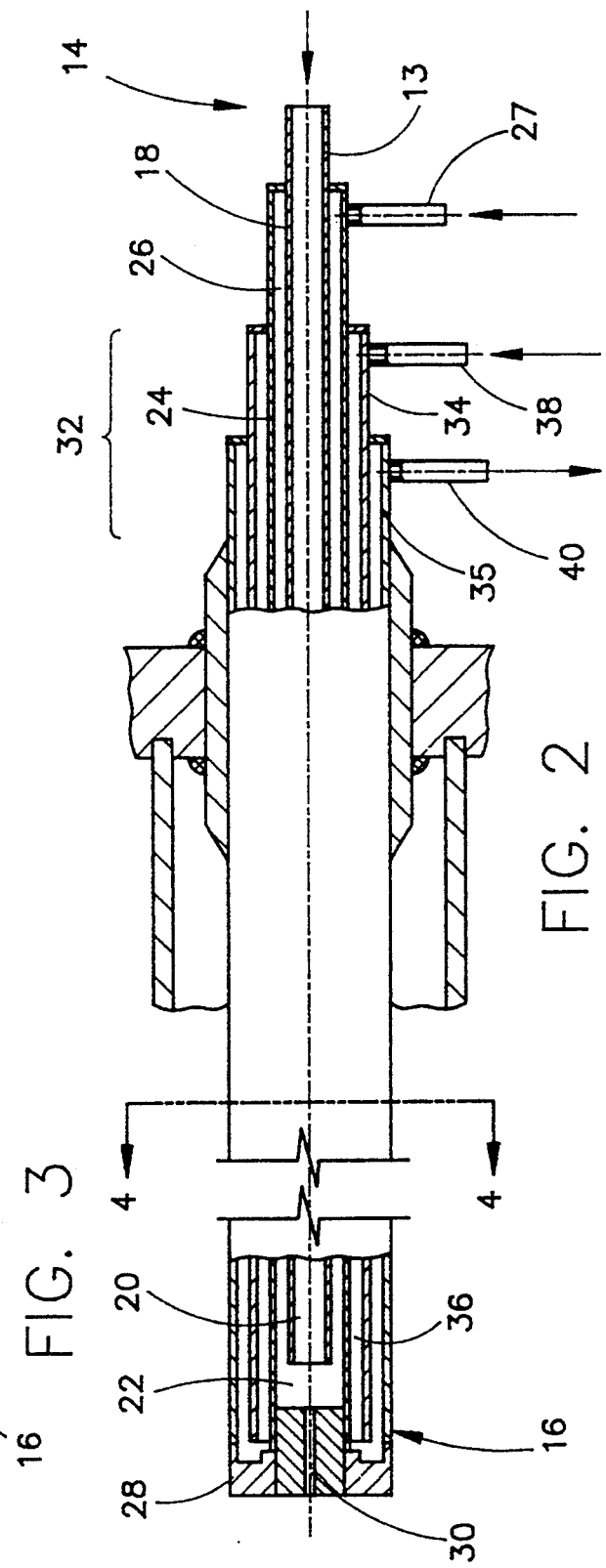

In another embodiment, the present feed line comprises an annular shroud disposed along a length of the injector apparatus, a source of hot shroud fluid for supply to the shroud, and a mixing zone in the shroud adjacent the discharge orifice for mixing the atomized coke inhibitor fluid with the shroud fluid for discharge into the feedstock flow. The coke inhibitor fluid can comprise a solution or dispersion of the inhibitor. A mass ratio of atomizing fluid to inhibitor fluid is from about 0.3 to about 2:1. The atomized inhibitor fluid has a preferred maximum droplet size of about 60 $\mu$m. The feed line preferably provides two-phase sonic flow through the orifice. The solvent or dispersion liquid is substantially evaporated in the shroud before discharge into the feedstock flow. A circulating coolant inhibits fouling in the discharge orifice. The cooling jacket preferably comprises concentric tubes sealed by the nozzle at the discharge end. The feed line can include an isolation valve for isolating the injection apparatus from the feedstock flow.

The shroud can include larger and smaller diameter sections and the larger section can have a shroud gas distributing baffle. The shroud gas can comprise a side stream of the feedstock flow. The shroud can include a slot formed in a wall for ingress of the feedstock side stream. An annular space between the shroud and the injection apparatus can have a pad gas flow to inhibit condensation of atomized coke inhibitor mixture therein. The shroud preferably has an inlet end outside the conduit for the introduction of the shroud fluid.

BRIEF DESCRIPTION OF THE DRAWINGS

FIG. 1 is a side sectional view, partially cut-away, partially in perspective, of an embodiment of the present invention showing a feed line to a pyrolysis furnace having an injection apparatus for a coke inhibiting agent installed in a conduit bend.

FIG. 2 is a side sectional view, partially in perspective, of the injection apparatus of FIG. 1 showing a central passageway, an annular passageway and an outer water jacket.

FIG. 3 is an exploded side sectional view of a nozzle end of the injection apparatus shown in FIG. 2.

FIG. 4 is an axial cross-sectional view of the injection apparatus of FIG. 2 along the lines 4—4.

FIG. 5 is a side sectional view, partially cut-away, partially in perspective, of a another embodiment of the present feed line showing an evaporation shroud encompassing the injection apparatus wherein a portion of the feedstock gas is used for a shroud gas.

FIG. 6 is a side sectional view, partially cut-away, partially in perspective, of a further embodiment of the present feed line showing an evaporation shroud encompassing the injection apparatus wherein the shroud gas is externally supplied.

FIG. 7 is a side view, partially cut-away, partially in perspective, of a modular embodiment of the present feed line showing an injection apparatus, externally mounted except for the shroud, wherein the shroud gas is externally supplied.

FIG. 8 is a side view, partially cut-away, of a retractable embodiment of the present feed line having an injection apparatus and shroud disposed in a conduit outside of the feedstock flow through an intermediate isolation valve wherein the injection apparatus can be retracted from the conduit and the valve closed without shutting down the furnace.

FIG. 9 is a side view, partially cut-away, of the retractable embodiment of FIG. 8 showing the shroud disposed within the feedstock flow and having a slant cut end.

DETAILED DESCRIPTION OF THE INVENTION

The injection apparatus of the present invention permits enhanced mixing of additive and feedstock streams. In addition, problems associated with a hot point injection of a coke inhibitor solution are largely avoided including plugging in the injection apparatus, and corrosive impingement on hot metal feed line surfaces.

The present invention is useful in any high temperature reaction process operating on a hydrocarbon feedstock such as ethane, propane, petroleum, naphtha, gas oil, kerosene, and the like wherein process equipment is subject to coke formation. Exemplary hydrocarbon reactions include pyrolysis, hydrocracking, fluidized catalytic cracking, catalytic reforming, and the like. For purposes of illustration, reference herein below is made to hydrocarbon pyrolysis. However, this should not be construed as a limitation on the utility of the present invention.

Referring to FIGS. 1–9, wherein like numerals reference like parts, a feed line 10 introduces a hydrocarbon feedstock and a coke inhibiting agent to, for example, a pyrolysis furnace (not shown). The coke inhibiting agent inhibits formation of coke deposits on downstream hot process surfaces, e. g., in the furnace. Since many excellent coke inhibitors are solids at ordinary conditions, they are typically added to the feedstock as a solution or dispersion in a carrier liquid. The particular selection of coke inhibitor and liquid carrier is not a limitation of the present invention of the injection apparatus and methodology by which the coke inhibitor and liquid carrier are mixed with the feedstock. For example, the coke inhibitor can be organic or inorganic, and the carrier liquid is typically water or another solvent. Various substances known to inhibit coke formation in a high temperature hydrocarbon reaction can be used in the present furnace feed line 10. For example, the present apparatus can be used to inject compounds of or containing boron, cobalt, molybdenum, sulfur, phosphorus, potassium and the like.

A low viscosity solvent for the coke inhibitor agent is a preferred carrier liquid. Choice of solvent will depend on the solubility properties of the agent and compatibility with the feedstock material. Water and low viscosity paraffinic hydrocarbons can be mentioned. For inorganic compounds, distilled water is a preferred carrier liquid. Alternatively, a carrier liquid which disperses the solid coke inhibitor can be used. As a result, the coke inhibitor can be delivered as a colloidal suspension or as an oil-in-water dispersion. Viscosity of the carrier liquid should be low to avoid excessive pump output pressure. The carrier liquid preferably has a viscosity equal to or less than the viscosity of water.

In the practice of the present invention, the coke inhibitor is injected at a hot point close to the furnace inlet. Hot point injection has been found to give enhanced coke inhibiting results. The feed line 10 typically has a temperature on the order of 650° C. (1200° F.). Pressure in the feed is generally on the order of 480 kPa (55 psig). Feedstock velocity commonly varies between 90–250 m/s (300–800 ft/s).

The feed line 10 comprises a conduit 11 having a feedstock flow and an injection apparatus 12 for the introduction of a liquid additive thereto. The injection apparatus 12 is preferably longitudinally disposed in the downstream portion of a conduit bend. The apparatus 12 has an inlet end 14 outside the conduit 11 and a discharge end 16 aligned adjacent a central axis of the feedstock flow. Thus, an aerosol 15 of the liquid coke inhibitor can be discharged in the center of the feedstock for good mixing. While any suitable means for attaching the injection apparatus 12 can be used, a preferred flanged coupling 17 is shown.

Referring particularly to FIGS. 2–4, the injection apparatus 12 comprises an inner tube be having a central passageway 20 and an outlet in fluid communication with a cylindrical mixing chamber 22. Inhibitor liquid pumped or pressure transported from a pressurized reservoir vessel (not shown) into the injection apparatus 12 at inlet end 14 flows through the passageway 20 into the mixing chamber 22.

The inner tube 18 is preferably concentrically received in an outer tube 24 forming an annular passageway 26 therebetween. The annular passageway 26 has an inlet port 27 for introduction of an atomizing fluid and an outlet port in fluid communication with the mixing chamber 22. Atomizing fluid (generally a gas) passes through the annular passageway 26 and mixes with inhibitor solution in the chamber 22.

Suitable atomizing gases include inert gases such as nitrogen, argon, and the like, steam and hydrocarbons such as methane, ethane, and the like. Atomizing gas assists atomization of the liquid inhibitor to an aerosol having a droplet size suitable for promoting the rapid evaporation of the liquid carrier in the conduit 11. In addition, the aerosol particle size is selected for enhancing dispersion in the feedstock flow. Mean particle size of aerosol droplets generally depends on a mass ratio of atomizing gas to coke inhibitor liquid. The mass ratio of gas:liquid will generally vary from about 0.3 to about 2:1 with an optimum ratio of about 1 and less significant benefit in the ratio range of 1–2. Typically, a higher gas/liquid ratio gives smaller droplet size. The atomized droplet size preferably has a mean diameter (sauter) from about 40 μm to about 100 μm. A particle size of the aerosol after solvent evaporation is generally on the order of 1–2 μm. As used herein, droplet and particle size generally refer to the Sauter mean diameter thereof.

The outer tube 24 has a nozzle 28 adjacent the mixing chamber 22 for restricting fluid flow through the injection apparatus 12. The nozzle 28 has one or more orifices 30 in fluid communication with the chamber 22 to atomize the mixed fluid passing from the mixing chamber 22 through the discharge end 16. It is understood that the number and diameter of the orifice(s) will depend on process design parameters such as desired aerosol particle size, nozzle pressure drop, inhibitor flowrate, gas/liquid ratio, and residence time required to evaporate the carrier liquid. Generally, a minimum orifice diameter (Sauter mean diameter) will be about 0.25 mm (0.01 in.) and a maximum orifice diameter will be about 3 mm (0.125 in.). The lengths and length/diameter ratios of the mixing chamber 22 and orifice 30 are preferably determined for obtaining two-phase sonic flow through the nozzle (based on the gas flowrate). Otherwise, flow through the orifice 30 can become choked. The pressure developed upstream of the nozzle is preferably two times the absolute downstream pressure or more to assure choked flow.

An important feature of the present injection apparatus 12 is an outer cooling jacket 32 abutting the nozzle 28 and jacketing the outer tube 24. The cooling jacket 32 prevents fouling of the central passageway 20 and the orifice 30. Fouling of the injection apparatus 12 can occur due to internal evaporation of the carrier liquid, accumulation of the solid inhibitor, and/or in some cases decomposition of the inhibitor or carrier liquid.

A bayonet style cooling jacket made up of concentric inside and outside tubes 34, 35 is preferably employed. The tubes 34, 35 are sealed at each end to form an annular passageway 36 for circulating a cooling fluid. The inside jacket tube 34 has an inlet port 38 for introducing the cooling fluid. The outside jacket tube 35 has an outlet port 40 for removing the cooling fluid. Cooling fluids such as water, glycol, and the like can be used. It can also be seen from FIGS. 2–3 that the cooling jacket 32 can be sealed at the discharge end 16 by the nozzle 28 to cool the orifice 30. The outermost surface of the cooling jacket 32 can also be insulated if desired (not shown). Cooling liquid should be circulated in the cooling jacket 32 at a rate suitable for preventing carrier liquid evaporation in the injection apparatus 12. The coke inhibitor liquid preferably has a temperature at the discharge end 16 of 45° C. or less.

Figure 6:
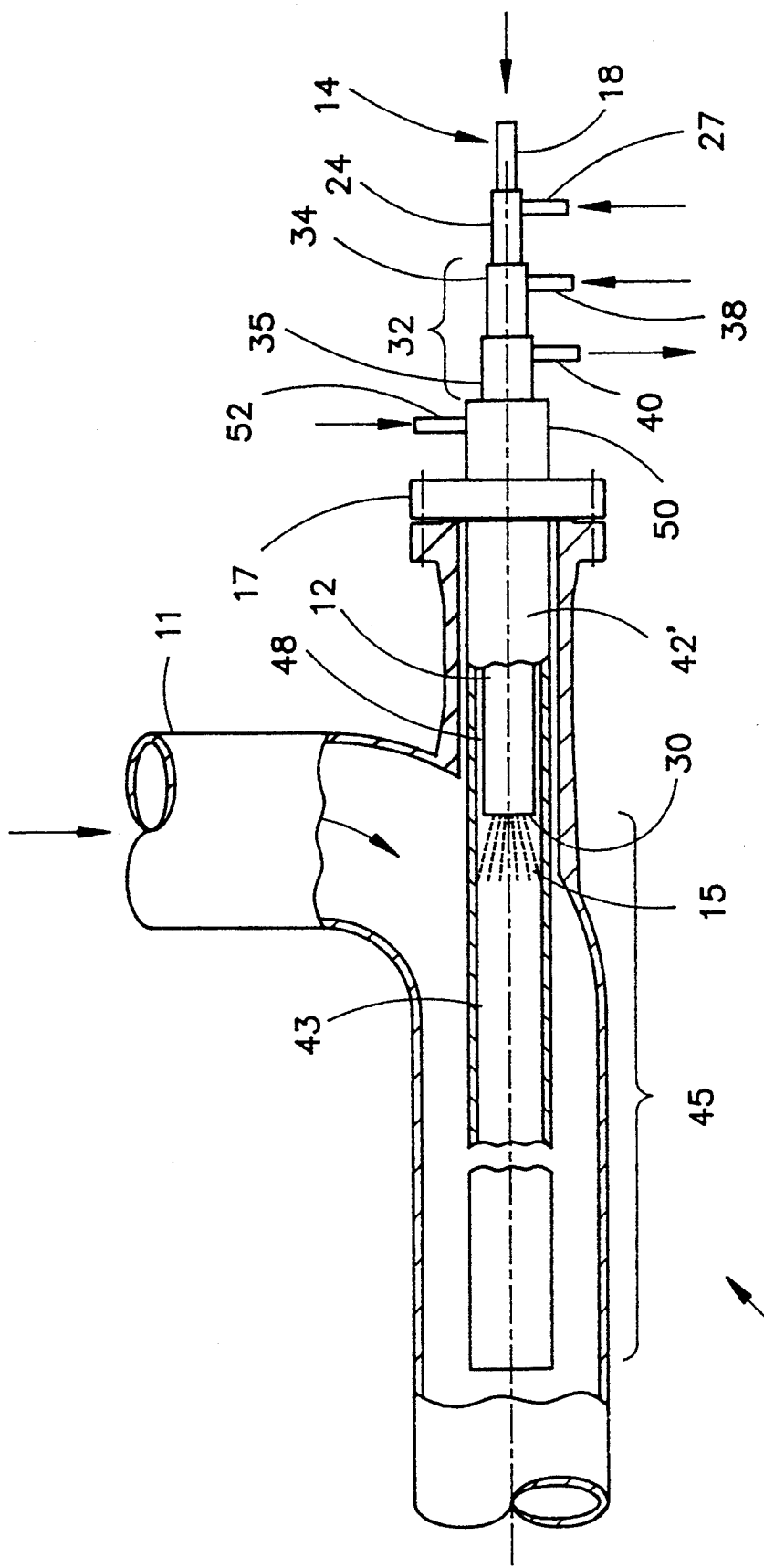

A tubular evaporation shroud can be used to help avoid droplet impingement on the conduit surfaces. Because flowrate in the shroud can be and preferably is lower than flowrate in the conduit 11, additional residence time for carrier evaporation can be obtained. In addition, any impingement of liquid carrier droplets is generally limited to an inside surface of the shroud which can be periodically sacrificed and replaced. Referring to FIGS. 5 and 6, a feed line 10′ includes the injection apparatus 12 which is encompassed by an exterior evaporation shroud 42. The shroud 42 has a passageway 43 and is generally disposed concentric to the cooling jacket 32. The liquid inhibitor discharged from the nozzle 30 into the shroud 42 has sufficient residence time to substantially evaporate the carrier liquid.

The inhibitor aerosol 15 is mixed with a shroud gas to transport the coke inhibitor through the shroud 42 into the feedstock flow. As seen in FIG. 5, the shroud gas can be introduced through a slot 46 in a shroud wall for ingress of a side stream of the hot feedstock flow. The shroud gas sweeps the passageway 43 and mixes with the inhibitor aerosol in a mixing zone 45. Heat from the feedstock flow and the shroud gas substantially evaporates the carrier liquid in the mixing zone 45.

The portion of feedstock entering the slot 46 is generally proportional to the pressure drop across the passageway 43. The dimensions of the shroud tube 42 and the slot 46 generally depend on required residence time in the mixing zone 45. The shroud gas flowrate also generally depends on the velocity required to transport the inhibitor aerosol particles into the feedstock flow and to prevent coalescence of droplets on adjacent surfaces of the shroud. It is desirable that the nozzle 30 of the injection apparatus 12 extend an adequate distance, e. g., about 6 to 9 times the diameter of the injection apparatus 12 (the outside tube 35) downstream from the slot 46, to develop a uniform velocity in the mixing zone 45.

In a preferred embodiment, an annular dead space 48 between the injection apparatus 12 and the shroud 42 is padded with an inert gas such as nitrogen, to prevent any inhibitor aerosol condensation formed on the inside shroud wall from accumulating in this area. The pad gas can have an inlet port (not shown) formed in the flange 17, for example.

In an alternative embodiment of the feed line 10′ as seen in FIG. 6, the injection apparatus 12 includes a tubular shroud 42′ having an inlet end 50 outside the conduit 11. The inlet end 50 has an inlet port 52 for introducing an external shroud fluid and developing a shroud flow through the passageway 43. The external shroud fluid should be compatible with the feedstock fluid. Compatible external shroud fluids can include, inert gases such as nitrogen, argon, and the like; hydrocarbons such as ethane, propane, butane, ISOPAR solvent vapor, and the like; superheated steam; and a side stream of the feedstock.

Figure 7:
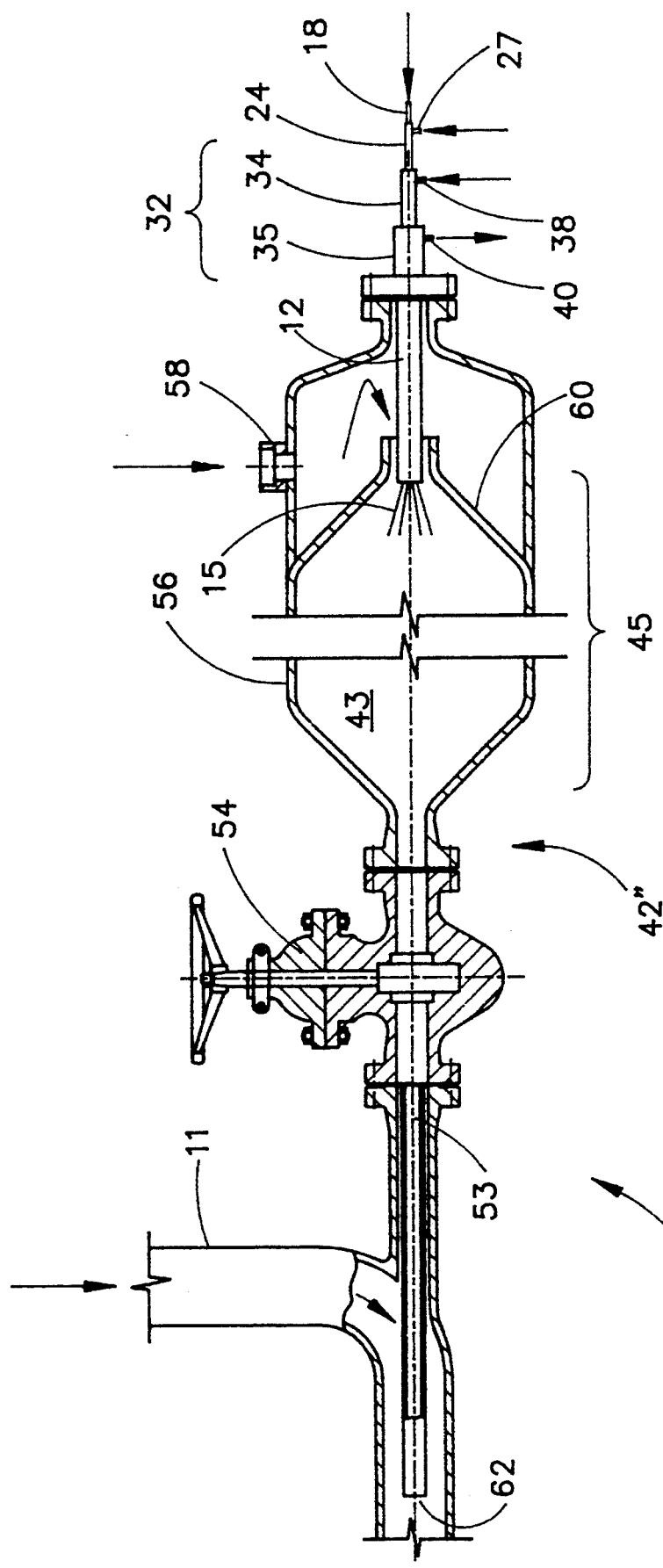

A modular alternative embodiment 10" of the present feed line is seen in FIG. 7. The injection apparatus 12 has a shroud 42" including a smaller diameter tubular section 53, an isolation valve 54 and a larger diameter tubular section or bonnet 56. The bonnet 56 has an inlet 58 for introducing the shroud gas. A baffle 60 enhances gas sweep through the bonnet 56. Conventional means such as flange connectors can be used to connect the injection apparatus 12 and shroud 42" to the conduit 11. The shroud discharge end in the conduit 11 can include a secondary nozzle 62 to promote supplemental atomization of the coke inhibitor. Since the injection apparatus 12 is mounted wholly outside the conduit 11, the injection apparatus 12, except for the shroud 42", can be disengaged from the conduit 11 without interfering with the process operation.

A retractable embodiment 10''' of the feed line is shown in FIGS. 8–9. The conduit 11 includes a flanged isolation valve 64 such as, for example, a gate valve. The valve 64 has a gate opening 66 which is large enough to deploy the injection apparatus 12 and an evaporation shroud 42''' in the conduit 11. The isolation valve 64 is attached to an end piece 68 including an inlet 70 for the shroud fluid and a stuffing box or packing gland seal in a seal housing 74. The valve 64 permits isolation of the conduit 11 following retraction of the injector 12 and also provides support. The packing gland facilitates retraction of the injection apparatus 12 during an operation such as coke inhibition pre-treatment, for example, without depressurization of the conduit 11 or gas release.

A safety chain 72 preferably used has one or more stop positions for the retraction of the injector 12. The safety chain 72 maintains the injector 12 in place in the seal housing 74, during removal and insertion, until the valve 64 is closed and pressure is released from the seal housing 74. Following closure of the gate and depressurization of the seal housing 74, the injector apparatus 12 can be removed for storage. One stop position for this purpose is preferably a mid-distance between a centerline of the valve gate and the face plane of a mounting flange 75 of the seal housing 74 at which the injector nozzle clears the valve opening 66. Insertion of the injection apparatus 12 under operating conditions is done by reversing the sequence.

In this manner, the injection apparatus can be inserted and removed without interruption of the operation of the process line 11. The anti-coking additive can be added during normal operation as desired, but can also be added in a pretreatment cycle wherein only steam is fed to the reactor in line 11, with additive injection. Where such pretreatment with the particular additive is all that is required, the injection apparatus would normally be removed after the pretreatment cycle is completed.

The shroud 42''' as seen in FIG. 9 can have an angled outlet end 76 to help prevent plugging of the shroud 42''' in the event of shroud flooding due to ineffective vaporization.

The feed line 10" (FIG. 7) is preferred when long residence time is required for evaporation of the carrier liquid and the length of the furnace inlet piping is limited. The shroud flow and bonnet dimensions will depend on the required evaporation residence time. The feed lines 10" and 10''' (FIGS. 7–9) can be used when inhibitor injection is required during a pre-treatment conditioning phase, when a single modularized injection system is used as a mobile unit in a multi-furnace pre-treatment system, and/or when a removable injector is desired to facilitate maintenance without shutting down the furnace. For steam pre-treatment cycle operation, the inhibitor solution is fed for a prescribed time, depending on the particular additive used, into the steam flowing through the lines 10" and 10''' and the preferred shroud fluid is super-heated steam.

The present invention is illustrated by reference to the following example.

EXAMPLE

A pilot scale furnace was assembled to demonstrate hot point injection of an inorganic coke inhibitor using the liquid injection apparatus of the present invention. The apparatus had an injector/bonnet assembly similar to the embodiment of FIG. 7 except that the shroud gas flowrate comprised the entirety of the feedstock flowrate, the distance from the injector discharge to the bonnet discharge comprised an evaporation zone and the distance from the bonnet discharge to the furnace inlet comprised a mixing zone. From the mixing zone, the gas mixture passed into a furnace zone wherein coking temperatures were reached. The furnace zone was set up at a right angle to the bonnet. The bonnet diameter was 8 cm (3 in.) and had an evaporation zone of 1 m (3 ft). The mixing zone was 0.8 m (2.5 ft) to an ell fitting and 0.5 m (1.5 ft) from the ell to the furnace zone. The furnace zone comprised a first heating section for increasing the feedstock temperature from about 675° C. to 925° C. (1250° F. to 1700° F.), a coke laydown section operating from 925° C. to 1040° C. (1700° F.–1900° F.) and an outlet section cooling the gas to about 1000° C. (1830° F.). The mixing zone was made from 0.5-inch schedule 40 INCOLOY 800 tubing. The furnace zone was made from 0.875-inch outside diameter, 0.493-inch inside diameter INCOLOY 800 tubing.

The feedstock-shroud gas comprised an ethane/steam mixture. Inlet temperature was 675° C. at 310 kPa (1250° F., 45 psia). Ethane flowrate was 5675 g/hr and steam flowrate was 1700 g/hr. Residence time in the bonnet was about 2 seconds.

Sufficient cooling water was circulated through the cooling jacket of the injection apparatus to maintain the injection nozzle at 43° C. (110° F.). The atomizing gas was air delivered at a flowrate of 680 g/hr. The inhibitor solution flowrate was 227 g/hr. The nozzle orifice diameter was 0.25 mm (0.010 in.). A near sonic discharge velocity of 640 m/sec (1960 ft/sec) was developed through the nozzle.

Estimated velocity and droplet size design parameters were calculated with the following results:
shroud gas velocity—13 m/sec (40 ft/sec);
aerosol velocity—8 m/sec (25 ft/sec);
average droplet size—20 $\mu$m;
maximum droplet size—60 $\mu$m; and
particle size of solid inorganic aerosol—1–2 $\mu$m.

A temperature drop of 150° C. (300° F.) occurred in the shroud. Furnace residence time above 850° C. (1600° F.) was sufficient to decompose the inorganic aerosol.

In one run, a blank inhibitor solution (distilled water) is used. In another run, the inorganic coke inhibitor solution is used. The inorganic inhibitor has a concentration of 1 g/L in distilled water. Following about 18 hours of operation, the furnace is shut down, cooled and examined for coke deposits. The run using the inorganic coke inhibitor produces less coke deposit compared to the blank.

The present feed line and injection apparatus are illustrated by way of the foregoing description and examples. The foregoing description is intended as a non-limiting illustration, since many variations will become apparent to those skilled in the art in view thereof. It is intended that all such variations within the scope and spirit of the appended claims be embraced thereby.

What is claimed is:

1. A feed line to a pyrolysis furnace having utility for feeding a hot feedstock comprising
   a coke inhibitor intimately mixed therewith comprising:
   a conduit for hot feedstock flow having an inlet for receiving the feedstock and an outlet for discharging the feedstock to the pyrolysis furnace;
   a longitudinal injector apparatus having an inlet end outside the conduit, and a discharge end centrally located in the conduit for discharging the coke inhibitor adjacent a central axis of the feedstock flow;
   a first central passageway in the injection apparatus for supplying a fluid comprising a coke inhibitor to the discharge end;
   a second central passageway in the injection apparatus for supplying an atomizing fluid to the discharge end;
   a cooling jacket for circulating coolant adjacent the second central passageway to inhibit fouling in the first central passageway of the injector apparatus;
   a mixing chamber at the discharge end in fluid communication with the first and second central passageways for receiving and mixing the coke inhibitor and atomizing fluids to form a fluid mixture therein;
   a discharge orifice in a nozzle adjacent the mixing chamber for atomizing the coke inhibitor fluid as the fluid mixture passes from the mixing chamber through the discharge orifice;
   an annular shroud disposed along a length of the injector apparatus;
   a source of shroud fluid for supply to the shroud; and
   a mixing zone in the shroud adjacent the discharge orifice for mixing the atomized coke inhibitor fluid with the shroud fluid for discharge into the feedstock flow;
   wherein the shroud fluid are adapted for substantially vaporizing the atomized coke inhibitor before passing from the shroud mixing zone.

2. The feed line of claim 1, wherein the coke inhibitor fluid comprises a solution or a dispersion of the inhibitor.

3. The feed line of claim 2, wherein the solvent or dispersion liquid is substantially evaporated in the shroud before discharge into the feedstock flow.

4. The feed line of claim 1, including an isolation valve for isolating the injection apparatus from the feedstock flow.

5. The feed line of claim 1, wherein the shroud includes larger and smaller diameter tubular sections.

6. The feed line of claim 5, wherein the larger diameter section has a baffle for enhancing mixing of the atomized inhibitor fluid with the shroud fluid.

7. The feed line of claim 1, wherein the shroud fluid comprises a side stream of the feedstock flow.

8. The feed line of claim 7, wherein the shroud includes a slot formed in a wall for ingress of the feedstock side stream.

9. The feed line of claim 8, wherein an annular space between the shroud and injection apparatus has a pad gas flow to inhibit condensation of the atomized coke inhibitor mixture therein.

10. The feed line of claim 1, wherein the shroud has an end outside the conduit, the outside end having a port for introduction of the shroud fluid.

11. The feed line of claim 1, wherein a mass ratio of atomizing fluid to inhibitor fluid is from about 0.3 to about 2:1.

12. The feed line of claim 1, wherein the atomized inhibitor fluid has a mean droplet size from about 40 $\mu$m to about 100 $\mu$m.

13. An injector apparatus adapted for injecting an atomized plugging fluid into a process stream in a conduit, comprising:
    an external end;
    a discharge end adapted to be positioned adjacent a central axis of flow in the conduit;
    a first central passageway for supplying the plugging fluid to the discharge end;
    a second central passageway for supplying an atomizing fluid to the discharge end;
    an annular jacket for circulating coolant adjacent the second passageway to inhibit fouling in the first central passageway;
    a mixing chamber at the discharge end in fluid communication with the first and second central passageways for receiving and mixing the plugging and atomizing fluids to form a fluid mixture;
    a discharge orifice in a nozzle adjacent the mixing chamber for atomizing the plugging fluid as the fluid mixture passes from the mixing chamber through the discharge orifice;
    an annular shroud disposed along a length of the injector apparatus;
    a source of shroud fluid for supply to the shroud; and
    a mixing zone in the shroud adjacent the discharge orifice for mixing the atomized plugging fluid with the shroud fluid;
    wherein the shroud and shroud fluid are adapted for substantially vaporizing the atomized plugging fluid before passing from the shroud mixing zone and into the process stream.

* * * * *